United States Patent [19]

Sasaki

[11] Patent Number: 4,786,811

[45] Date of Patent: Nov. 22, 1988

[54] IONIZATION TYPE-SMOKE DETECTOR

[75] Inventor: Toru Sasaki, Tokyo, Japan

[73] Assignee: Nohmi Bosai Kogyo Co., Ltd., Tokyo, Japan

[21] Appl. No.: 3,717

[22] Filed: Jan. 16, 1987

[30] Foreign Application Priority Data

Jan. 17, 1986 [JP] Japan .................................. 61-4094
Jan. 17, 1986 [JP] Japan .................................. 61-4095

[51] Int. Cl.4 .................................................. G01T 1/18

[52] U.S. Cl. .................................. 250/385.1; 250/384

[58] Field of Search .................... 250/385 R, 384, 382, 250/381, 379, 374; 340/579, 577

[56] References Cited

U.S. PATENT DOCUMENTS

Re. 30,323 7/1980 Tomioka ............................ 250/385
3,662,177 5/1972 Sasaki et al. ........................ 250/384
4,234,877 11/1980 Maruyama et al. ................ 340/629
4,594,512 6/1986 Sasaki .......................................... 250/384
4,652,866 3/1987 Siegmann et al. ................ 340/628

*Primary Examiner*—Janice A. Howell
*Assistant Examiner*—Constantine Hannaher
*Attorney, Agent, or Firm*—Amster, Rothstein and Ebenstein

[57] ABSTRACT

An ionization-type smoke detector having inner and outer ionization chambers, a radioactive source to ionize the air within the inner and outer ionization chambers and a printed board to mount electrical circuits for detecting electrical potential at the connecting portion between both chambers is made to be relatively thin by arranging the inner, intermediate and outer electrodes so that they are respectively vertically mounted to the printed board while being transversally spaced apart from each other.

3 Claims, 1 Drawing Sheet

IONIZATION TYPE-SMOKE DETECTOR

BACKGROUND OF THE INVENTION

The present invention relates to an ionization-type smoke detector and more particularly to an ionization-type smoke detector being relatively thin with the inner and outer ionization chambers being arranged transversely.

Conventional ionization-type smoke detectors have been constituted such that the inner and outer ionization chambers as well as the electrical circuits are disposed vertically. That is, detectors in which the outer ionization chamber, inner ionization chamber and the electrical circuits are stacked from the bottom up in the above order are adapted to be secured to a base installed on the ceiling of a room, etc. for detecting the possible occurrence of a fire.

Thus, since conventional ionization-type smoke detectors have their essential components arranged axially or vertically, when they are mounted to the surface of the ceiling of a room, etc. they protrude considerably from the ceiling, affecting its appearance.

SUMMARY OF THE INVENTION

Therefore, it is an object of the present invention to provide an ionization-type smoke detector which is relatively thin having a low overall height.

It is another object of the present invention to provide an ionization-type smoke detector which can be electrically shielded easily, making the manufacturing cost lower.

In accordance with the present invention an ionization-type smoke detector having inner and outer ionization chambers, a radioactive source for ionizing the air within the inner and outer ionization chambers, and electrical circuits for detecting electrical potential at a connecting point between the inner and outer ionization chambers is provided in which plate-like outer, intermediate and inner electrodes are respectively disposed vertically on a printed board at fixed intervals, whereby the inner electrode is provided with the radioactive source and the intermediate electrode being formed with a through-hole, the radioactive source provided at the inner electrode irradiating through the through-hole to the outer ionization chamber comprised by the intermediate and outer electrodes so as to ionize the air within the outer ionization chamber.

BRIEF DESCRIPTION OF THE DRAWINGS

The above brief description, as well as further objects, features and advantages of the present invention will become more fully understood by reference to the following detailed description of the presently preferred, but nonetheless illustrative embodiment, in accordance with the present invention, when taken in conjunction with the accompanying drawings, wherein.

BEST MODE FOR CARRYING OUT THE INVENTION

Figure 1:
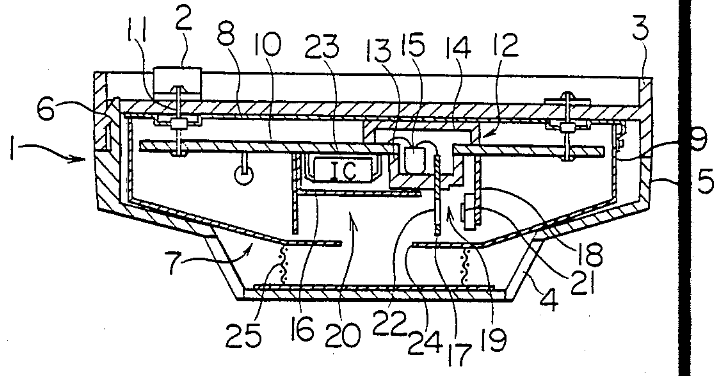
FIG. 1 is a longitudinal cross-sectional view of one embodiment of an ionization-type smoke detector in accordance with the present invention.
Figure 2:
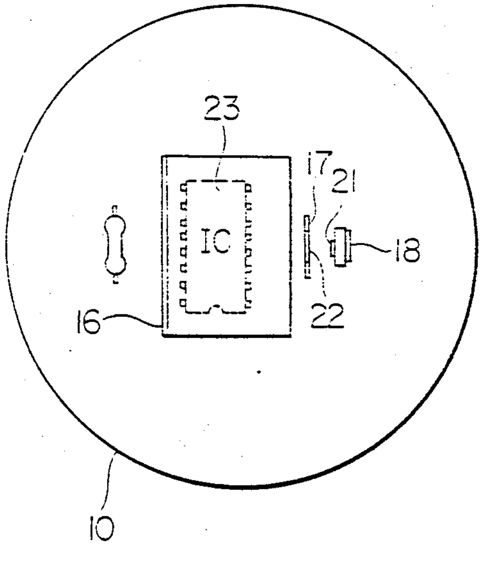
FIG. 2 is a plan view of the printed board and the inner and outer ionization chambers shown in FIG. 1.

In FIG. 1 the reference numeral 1 indicates a detector cover made of synthetic resin and which comprises a detector base 3 provided with knife-edge metal fixtures 2 which simultaneously serve as electrical connecting terminals to the base and a bottom cover 5 provided with smoke inlets 4, whereby the base 3 and the bottom cover 5 are connected together by engaging portions 6. Numeral 7 indicates a shield case made of metal and disposed within the detector cover 1 which comprises a ceiling part 8 and a cup-like part 9, whereby the ceiling and cup-like parts 8, 9 are connected together by means of a force-fit, caulking or the like.

Reference numeral 10 indicates a printed board which is fixed to the knife-edge fixtures 2 through connecting pins 11 by such as soldering. Numeral 12 is a container provided on the printed board 10 comprising an insulation base 13 and a cover 14, a field-effect transistor 15 being housed therein. Numerals 16, 17 and 18 indicate respectively an outer electrode having a T-shaped cross section, an intermediate electrode having a plate-like configuration, and an inner electrode, each being mounted to the printed board 10 on its under surface vertically while being transversally spaced apart from each other. In this case, in particular the intermediate electrode 17 is mounted to the printed board 10 through the insulation base 13 in order to improve the insulation effects. Thus, an inner ionization chamber 19 is formed between the inner electrode 18 and the intermediate electrode 17, and similarly an outer ionization chamber 20 is formed between the intermediate electrode 17 and the outer electrode 16.

Reference numeral 21 indicates a radioactive source provided on the inner electrode 18 which also irradiates into the outer ionization chamber 20 through a through-hole 22 formed in the intermediate electrode 17 so that the air within the inner and outer ionization chambers 19 and 20 is ionized. Numeral 23 indicates an integrated circuit such as an amplifier, etc. which is housed between the printed board 10 and the outer electrode 16 in order to magnetically and electrostatically shield it. In this case, it will be appreciated that when the integrated circuit 23 contains substantially all of the circuit elements the cup-like part 9 of the shield case 7, and, if required, even the ceiling part 8 may be eliminated. A smoke inlet 24 is formed in the cup-like part 9 at its bottom and 25 is a metal mesh disposed between the bottom of the cup-like part 9 and the bottom cover 5.

Now the operation of the smoke detector in accordance with the present invention and having such a constitution as described above will be explained.

On assembly the plate-like electrodes 16, 17 and 18 are vertically mounted on the printed board 10 at predetermined intervals therebetween so that the inner and outer ionization chambers 19 and 20 are formed transversally, the integrated circuit 23 being housed between the printed board 10 and the outer electrode 16. The printed board 10 is fixed to the knife-edge fixtures 2 through the connecting pins 11 by such as soldering. Then the bottom cover 5 is engaged in the detector base 3, resulting in a relatively thin ionization-type smoke detector.

The radioactive source 21 provided in the inner ionization chamber 19 ionizes the air within it and simultaneously irradiates the outer ionization chamber 20 through the through-hole 22 formed in the intermediate electrode 17 to also ionize the air within chamber 20.

In this state, should a fire occur, smoke having a predetermined concentration enters the inner and outer ionization chambers 19 and 20 through the smoke inlets 4. In this case, since the inner ionization chamber 19 is used in a saturated ionic current region no change in ionization current occurs therein, while the ionization current in the outer ionization chamber 20 decreases due to the smoke entering therein, the change in ionization current by a predetermined value being detected by the detection circuits of the printed board 10 which is transmitted to a receiver not shown through the knife-edge fixtures 2 and the electric passages also not shown. Thus, an outbreak of fire is detected.

From the foregoing it will be appreciated that the present invention provides a relatively thin ionization-type smoke detector with a simple constitution. Further, if an outer electrode having a T-shape cross section is vertically mounted to the printed board, since the circuit elements are housed within a space between the outer electrode and the printed board the integrated circuit elements which may in principle be thin in shape can be electrically shielded easily.

While a preferred embodiment of the present invention has been described and illustrated herein it will be understood that modifications may be made without departing from the spirit of the present invention.

What is claimed is:

1. An ionization-type smoke detector having inner and outer ionization chambers, a radioactive source to ionize the air within said inner and outer ionization chambers, electrical circuit elements to detect electrical potential at a connection point between said inner and outer ionization chambers, and a printed board mounted horizontally in said detector to support said electrical circuit elements, said radioactive source producing radiation in a direction parallel to said printed board to ionize the air within said inner and outer ionization chambers, plate-like outer, intermediate and inner electrodes respectively mounted to and extending vertically from said printed board at fixed intervals to form said inner ionization chamber between said inner and intermediate electrodes, and to form said outer ionization chamber between said outer and intermediate electrodes, said inner electrode supporting said radioactive source, said intermediate electrode being formed with a through-hole such that said radioactive source can irradiate into said outer ionization chamber through said through-hole to ionize the air within said outer ionization chamber and, said outer electrode shielding at least those of said electrical circuit elements which must be electrically shielded.

2. An ionization-type smoke detector as claimed in claim 1 wherein said outer electrode is formed so as to have a T-shaped cross section, and said electrical circuit elements which must be electrically shielded are disposed within a space formed between said outer electrode and said printed board.

3. An ionization-type smoke detector as claimed in claim 1 wherein said intermediate electrode is vertically mounted to said printed board through an insulation board.

* * * * *